United States Patent [19]

Holt et al.

[11] Patent Number: 5,343,785
[45] Date of Patent: Sep. 6, 1994

[54] ULTRASONIC BOLTING CONTROL APPARATUS

[75] Inventors: William J. Holt, Aptos; Kenneth R. Boyd, Santa Cruz, both of Calif.

[73] Assignee: Emerson Electric Co., St. Louis, Mo.

[21] Appl. No.: 781,780

[22] Filed: Oct. 23, 1991

[51] Int. Cl.$^5$ ............................................ B25B 29/02
[52] U.S. Cl. ...................................... 81/57.38; 73/761
[58] Field of Search ................. 81/57.38, 429; 73/761, 73/597

[56] References Cited

U.S. PATENT DOCUMENTS

| | | | |
|---|---|---|---|
| 4,014,208 | 3/1977 | Moore et al. | 73/761 X |
| 4,294,122 | 10/1981 | Couchman | 73/761 |
| 4,471,657 | 9/1984 | Voris et al. | 73/761 X |
| 4,738,145 | 4/1988 | Vincent et al. | 73/761 X |
| 4,846,001 | 7/1989 | Kibblewhite | 73/761 |
| 4,957,002 | 9/1990 | Coyle, Jr. et al. | 73/761 |
| 5,094,301 | 3/1992 | Wipperman et al. | 73/761 X |
| 5,226,327 | 7/1993 | Fassina | 73/761 |

Primary Examiner—D. S. Meislin

[57] ABSTRACT

Apparatus (10) for measuring and controlling the tensile load on a fastener (F). The fastener is positioned to connect together two or more components (X) of a workpiece. A drive unit (12) couples to the fastener to thread it into place. The fastener exerts a clamping force on the components to connect them together. The clamping force created by the fastener produces an equal and opposite tensile force on the fastener. A controller (16) starts and stops operation of the drive unit. The controller controls the drive unit to thread the fastener into place until it exerts a predetermined amount of clamping force on the components. A test unit (18) generates ultrasonic waves and transmits them lengthwise through the fastener. The transit time of the waves through the fastener is then measured. The transit time of the waves is a function of the tensile force on the fastener and, in turn, a function of the clamping force exerted by the fastener.

22 Claims, 4 Drawing Sheets

ULTRASONIC BOLTING CONTROL APPARATUS

BACKGROUND OF THE INVENTION

This invention relates to fastening systems and, more particularly, to apparatus for ultrasonically measuring the tensile load in a threaded fastener such as a bolt.

There are a wide variety of fasteners used in wide range of applications. Regardless of the application, however, all involve the use of a fastener to produce a clamping force on two or more components to connect them together. A primary factor in the performance of the connection is whether or not a correct amount of clamping force is used. Too little clamping force results, for example, in slippage or leakage. Too much force causes the connection to ultimately fail.

The accuracy with which a clamping force is applied does depend greatly upon the particular application. If wooden structural members are to be bolted together, for example, an adequate connection is usually achieved simply by applying enough clamping force to imbed the head of a bolt, or its associated washer, in the surface of the wood. On the other hand, where sections of an airframe are bolted together, precise clamping forces must be applied to result in a proper connection. As a practical matter, the importance of accurate tightening control is a direct function of the complexity and performance criteria of the fastener application.

The continued development of lighter, more efficient structures and machines, has mandated better methods of controlling fastener loading. Without discussing the various methods currently in use, suffice it to say that each relies, in one form or another, on the measurement of physical phenomena which is related, in some manner, to a clamping force generated by the tightening of a fastener. Where only one or two connections must be monitored, these various methods are adequate. If, however, there is a large number of connections, and the clamping force of each must be controlled, the relationship between the measured effect of an applied clamping force becomes less predictable. If the method of measurement involves applied torque, this unpredictability increases.

Basically, in fastening systems, torque is that effort required to turn a nut against the inclined plane of the threaded portion of a bolt. While, theoretically, it should be possible to use torque as a measure of fastening force, tests have shown that frictional forces absorb the majority of the tightening forces produced. Consequently, torque turns out to be an unreliable measure, especially when factors such as the material from which the fastener is made, thread fit, and lubrication must be taken into account.

SUMMARY OF THE INVENTION

Among the several objects of the present invention may be noted the provision of bolting control apparatus; the provision of such apparatus for quickly, efficiently, and accurately measuring the forces exerted on a fastener and for determining if these forces fall within an acceptable range of forces; the provision of such apparatus using ultrasonic measurements rather than a measurement strategy based on applied torque to accurately determine the fastening force; the provision of such apparatus which is more accurate and reliable than torque based control systems; the provision of such apparatus which is incorporated into a fastening tool for controlling tightening, or into a multi-station control system for assembly line operations; the provision of such apparatus which is automated so to provide the user with fast and accurate measurements, thereby to effect proper control over the operation; the provision of such apparatus capable of measuring fastener load at sufficient speed to provide real-time control of a fastener tightening process; the provision of such apparatus which is readily programmable to accommodate different type fasteners with different structural characteristics, as well as differences in the materials being fastened, the amount of force to be applied, etc.; and, the provision of such apparatus to cost approximately the same as current torque based control systems.

In accordance with the invention, generally stated, apparatus is provided for measuring and controlling the tensile load on a fastener. The fastener is positioned to connect together two or more components. A drive couples to the fastener to thread the fastener into place. The fastener exerts a clamping force on the components to connect them together, and this clamping force produces an equal and opposite tensile force on the fastener. A controller starts and stops operation of the drive unit. The controller controls threading of the fastener by the drive unit so the fastener exerts a predetermined amount of clamping force on the components. A test unit generates ultrasonic waves and transmits them lengthwise through the fastener. The transit time of the waves is measured. The time is a function of the tensile force on the fastener and, in turn, a function of the clamping force exerted by the fastener. A method of measuring and controlling tensile load on a fastener is also disclosed. Other objects and features will be in part apparent and in part pointed out hereinafter.

BRIEF DESCRIPTION OF THE DRAWINGS

Corresponding reference characters indicate corresponding parts throughout the drawings.

DESCRIPTION OF A PREFERRED EMBODIMENT

Figure 1:
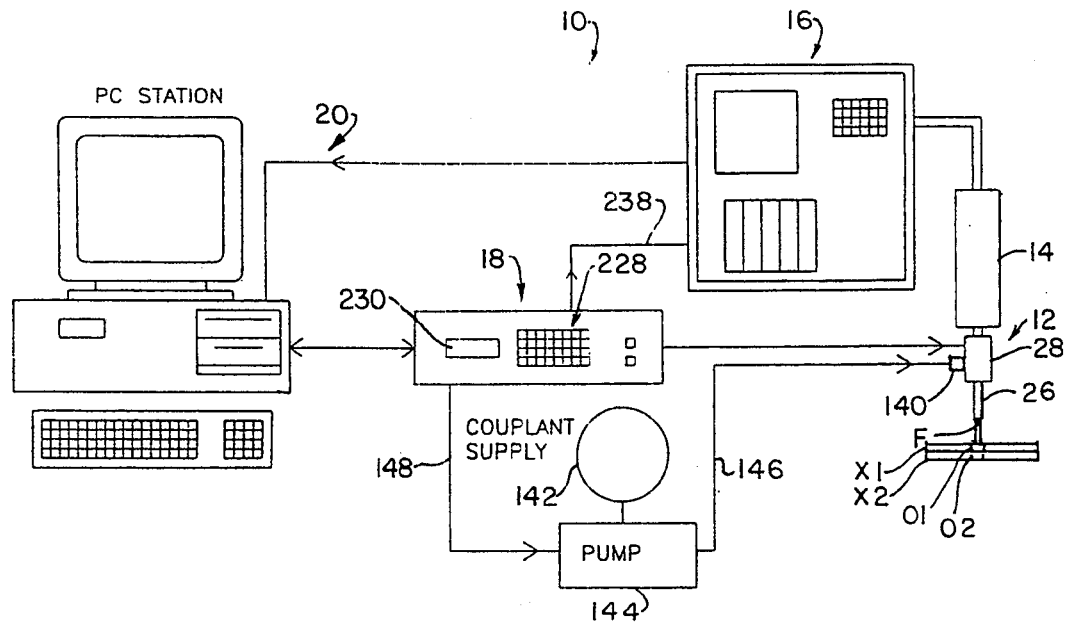
FIG. 1 is a block diagram of ultrasonic bolting control apparatus of the present invention.

Referring to the drawings, apparatus of the present invention for measuring and controlling the tensile load on a fastener F is indicated generally 10 in FIG. 1. The apparatus is designed to operate as a stand alone system which is usable with a wide range of automatic bolting or fastening machines. Or, the apparatus can be incorporated in such equipment, or into multi-station assembly line control stations. Regardless, apparatus 10 functions to measure the clamping force exerted by a fastener on two or more components X1, X2, for example. As shown in FIG. 1A, components X1, X2, which are to be clamped together, have respective openings 01, 02. Opening 02 is a threaded opening. The fastener is threaded into these openings, and as it is tightened therein, exerts an increasing clamping force on the components. As the clamping force increases, the fastener is subjected to an equal but opposite tensile load. The fastener stretches or elongates in direct proportion to this tensile load.

In certain applications, it is necessary that the amount of clamping force exerted by fastener F be precisely controlled. Heretofore, the clamping force has been measured as a function of applied torque on the fastener. It is an important feature of apparatus 10 that rather than using a torque measuring technique, an ultrasonic wave testing methodology is used. This avoids the various problems associated with torque measuring techniques and provides highly accurate test results. In addition, the apparatus and test method allow for volume manufacturing since, as noted above, apparatus 10 can be incorporated into bolting and fastening machines.

In operation, a fastener F is mounted in a rotatable couplant 12, which, in turn, is adapted for connection to a spindle motor 14. The spindle motor is driven by a control means 16 which operates motor 14 to drive or thread the fastener into the components. As will be described hereinafter, a test means 18 generates ultrasonic waves which are transmitted lengthwise through the fastener. Means 18 measures the transit time of the waves through the fastener, it being understood that the transit time of the waves is a function of the tensile force on the fastener. As discussed above, this load is a function of the clamping force exerted by the fastener on the components. A computer 20 is usable to program the operation of the apparatus. The computer is a personal computer of the type commonly referred to as a PC, and manufactured by IBM Corporation of Armonk, N.Y.

Since, for example, ultrasonic waves propogate at different velocities through different materials, the test means can store a schedule of these materials. Prior to the start of an assembly operation, the user can readily designate the material from which a fastener is constructed and the test apparatus will automatically adjust for this material. Similarly, the user can program the test means for the tensile load which represents a predetermined clamping force which the fastener is to exert. The test means monitors the amount of torque to which the fastener is subjected. While torque is not a measured parameter for purposes of determining when the fastener is sufficiently tight, it is used to determine whether or not a fastener has failed during a threading operation. Thus, if the torque value suddenly falls to zero, it indicates the fastener has failed and that the threading operation should be stopped so the fastener can be replaced with a new one.

In addition, computer 20 can store the results of the tests performed during a production sequence. Afterwards, this test data can be evaluated by the computer to provide different types of graphs, statistical data presentations, or other outputs which are useful for quality control purposes, materials evaluation, etc. Thus, for example, it may be important to know the range of fastener elongation during a production run. Since fastener elongation is proportional to the clamping force exerted by the fastener, and since the clamping force (or torque, if the user wishes a torque related measurement) will usually include a range of acceptable values (i.e., a.00+/−0.b ft.−lbs.). The capability to reproduce test data which indicates the results of a bolting operation in a variety of ways will be beneficial to the user. The computer can also store data to a disk for archival purpose.

Figure 2:
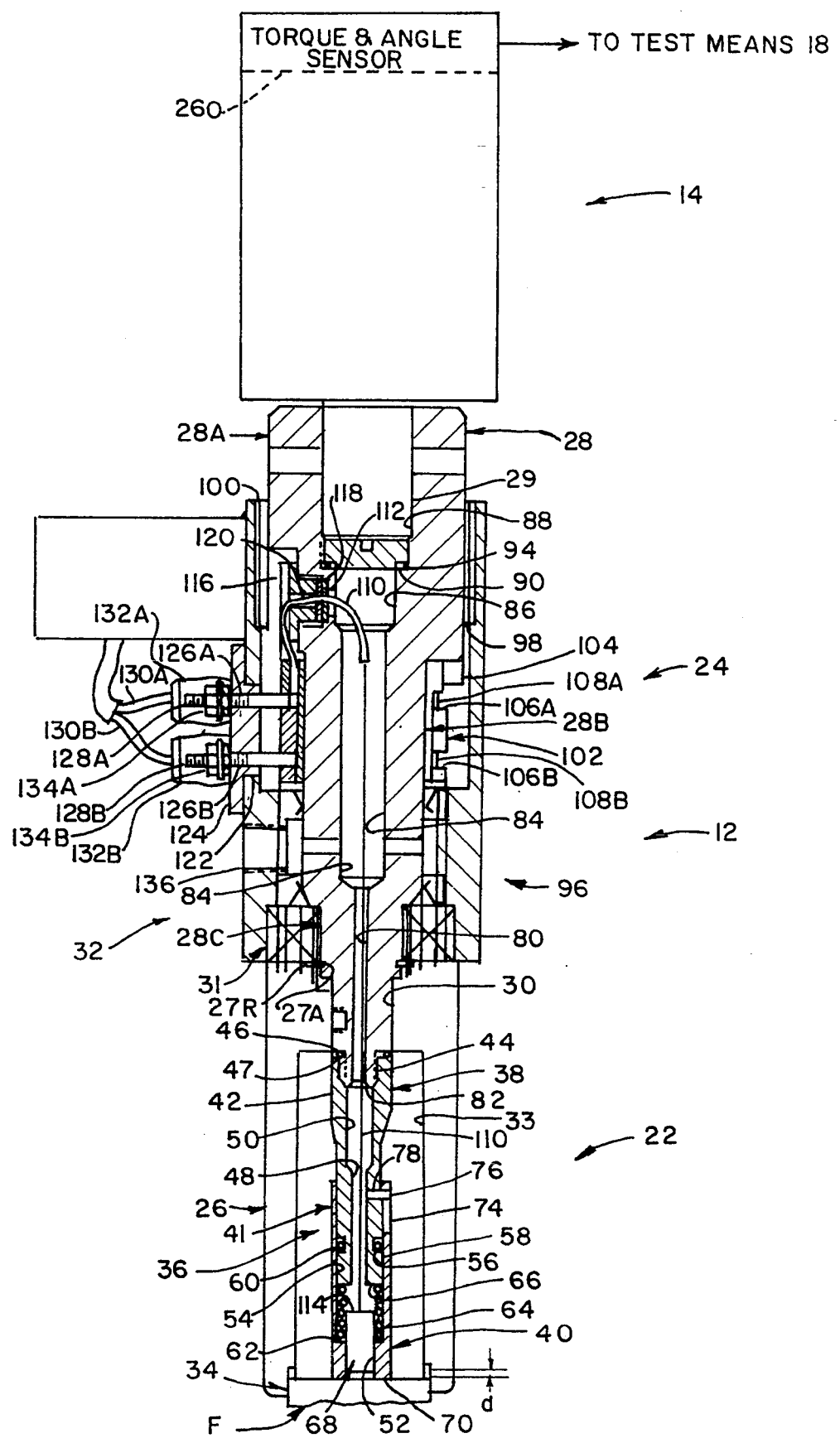
FIG. 2 is an elevational view, partly in section, of a couplant for threading a fastener into place and housing an ultrasonic transducer of the apparatus by which clamping force measurements are performed.

Referring now to FIGS. 2, couplant 12 has a lower fastener drive portion 22 and an upper slip ring portion 24. The upper portion attaches to motor 14; while a fastener F attaches to the lower portion. As seen in FIG. 2, couplant portion 24 includes an impact socket 26 comprising a hollow sleeve. The upper end of the sleeve interfits with an adaptor socket 28 which interfits with a drive head 29 of motor 14. Socket 26 has a concentric bore 30 in which the lower end of socket 28 is received. An annular race 27A is formed in the outer face of socket 28 where it and socket 26 interfit. A ball bearing assembly 27B fits in the race. The upper end of socket 26 fits into a receptacle 31 defined by the socket 28 and a slip ring assembly 32 to be described in more detail hereinafter. Socket 26 further has a counterbore 33 extending upwardly from the lower end of the socket. An opening 34 at the mouth of the counterbore has an appropriate contour (square, or hexagonal, for example) to fit over the head of fastener F. Since couplant 12 is rotatable by motor 14, as socket 28 turns, it turns socket 26 which threads the fastener into the openings in the components being fastened together. A slide assembly 36 is received in counterbore 33 for installation therein. Assembly 36 includes an inner slide 38 and an outer slide 40. Both slides are hollow, and the inner diameter of slide 40 corresponds to the outer diameter of the lower section 41 of slide 38 for slide 40 to fit over slide 38 and move relative thereto. The upper end of slide 38 has a larger outer diameter section 42 which attaches onto tip end 44 of socket 28. Tip end 44 is threaded and sized to fit in bore 30 of socket 26. The lower portion of the tip end extends into counterbore 32. The upper end of slide 38 is matingly threaded to tip 44 for attaching the upper and lower portions of couplant 12 together. An O-ring oil seal 46 is installed in an annular opening 47 to fit about the tip end of socket 28 when slide 38 is attached to tip end 44.

Slide 38 has a concentric, longitudinally extending bore 48 and a counterbore 50. The counterbore is threaded at its outer end for attachment of the slide assembly to socket 28, and the counterbore extends to a point intermediate the length of slide 38. Slide 40 has a concentric longitudinally extending bore 52 and counterbore 54. Section 41 of slide 38 is received in counterbore 54 and an annular groove 56 is formed in the outer sidewall 58 of section 41. Another O-ring seal 60 is installed in groove 56. A shoulder 62 is formed at the transition between bore 52 and counterbore 54 of slide 40. One end of a compression spring 64 seats against this shoulder and the other end of the spring bears against the end face 66 of slide 38 which is received in slide 40.

A piezoelectric transducer 68 of test means 18 is cylindrically shaped for installation in bore 52 of slide 40. For this purpose, the diameter of the transducer corresponds with that of bore 52. As shown in FIG. 2, while an end face 70 of slide 40 abuts against the upper end of fastener F, the lower end of the transducer is spaced therefrom a distance d. This distance may, for example, be 0.060 in. (0.015 cm.). The reason for this spacing is that an oil film is present between the transducer and the head of the fastener during use of the apparatus. As is described hereinafter, when tansducer 68 is pulsed, it generates an ultrasonic wave which is directed at the fastener. When the wave passes through the film and into the fastener, an echo is produced as the wave crosses the interface between the film and the fastener.

This echo is more pronounced, and therefore more readily detectable by test means 18 than if the transducer directly contacted the fastener. The oil filled spacing between the transducer and fastener helps compensate for errors due to motion of the fastener relative to the transducer.

A longitudinal slot 74 is formed in the upper end of slide 40. A dowel pin stop 76 is installed in an opening 78 formed in sidewall 58 of slide 38. The stop extends radially outwardly into the slot. When positioned as shown in FIG. 2, slide 40 is at one extreme position with the dowel pin bearing against the sidewall of the slide at the upper end of the slot. With respect to adaptor socket 28, it has a concentric, longitudinal bore 80 with a mouth 82 at the tip end 44 of the socket. The socket has respective first, second, and third counterbores 84, 86, and 88 each of which is successively larger in diameter, these counterbores extending upwardly from the lower portion of socket 28 as viewed in FIG. 2. A shoulder 90 is formed at the junction between counterbores 86 and 88. A plug 92 is sized to fit in bore 88. An oil seal 94 seats against shoulder 90 and is compressed against the shoulder by the plug. Bore 88 is, as noted, contoured so drive head 29 of motor 14 interfits with the socket and can turn the sockets when motor 14 is running and thread the fastener.

Slip ring assembly 32 comprises a cylindrical sleeve 96 which fits over adaptor socket 28. Socket 28 has an upper section 28A, an intermediate section 28B, and a lower section 28C. Section 28B has a smaller outside diameter than section 28A, and section 28C has a smaller outside diameter than section 28B. Tip end 44 of socket 28 has a yet smaller outside diameter than the upper portion of socket section 28C. The outside diameter of sleeve 96 is uniform along the length of the sleeve. The inside diameter of the sleeve does vary to not only accommodate the various changes in the outer diameter of socket 28, but also to allow for the installation of various components of the slip ring assembly. At the upper end of the sleeve, the inner diameter of the sleeve is greater then the inner diameter of sleeve at its middle section. A circumferential shoulder 98 is formed at the junction between these two sections of the sleeve. A bushing 100 fits in the annular space between the sleeve and the upper section of socket 28, this bushing seating on shoulder 98.

A slip ring 102 fits about the middle section of socket 28, the height of the slip ring generally corresponding to the length of section 28B of the socket. An anti-rotation screw 104 extends radially inwardly into the slip ring, at its upper end, to adjust the pressure exerted by the slip ring on socket 28. Intermediate the length of the slip ring are two circumferential, longitudinally spaced grooves, 106A, 106B respectively. An electrically conductive ring 108A, 108B, respectively, is set into the grooves. An electrical wire 110 is electrically attached to ring 108A. The wire is inserted into bore 86 of socket 28 through an opening 112 extending radially inwardly from the side of the socket. This wire extends through the longitudinal central openings in socket 28 and slides 38 and 40 to electrially contact the upper face 114 of transducer 68. A plug 116 having a seal 118 on its inner end fits over opening to form an oil seal. The plug has a central bore 120 communicating with opening 112 for wire 110 to extend through bore 120 into the opening.

An opening 122 is formed in the side of sleeve 96 radially outwardly of conductive rings 108A, 108B. A cap 124 fits into this opening. The cap has a pair of threaded openings 126A, 126B into which are threaded electrical terminals 128A, 128B respectively. These terminals comprise elongate threaded posts which are adjustably insertable into respective openings 126A, 126B until the inner ends of the posts electrically contact the respective rings 108A, 108B. Electrical output lines 130A, 130B from test means 18 terminate in electrical terminals 132A, 132B respectively. These latter terminals are attached to the respective posts by nuts 134A, 134B which thread onto the outer end of the respective posts. By this slip ring arrangement, electrical signals from the test means can be applied to the transducer as the motor threads the fastener into the components.

A second opening 136 is formed in the side of sleeve 96 below opening 122. A concentric opening 138 extends radially through the sidewall of socket 28. A fluid or oil fitting 140 (see FIG. 1) is installed in these openings. Oil, for example, a standard comercially available thirty-weight oil, is introduced into the bore of socket 28 through this fitting. This oil is from an oil supply 142, and is delivered to couplant 12 by an oil pump 144 via an oil supply line 146. Operation of pump 144 is via a command input from test means 18 over a control line 148. The oil flows down, and around transducer 68, filling the space between the bottom of the transducer and the head of fastener F. As previously discussed, the ultrasonic waves generated by transducer 68 are propagated through the oil film to the fastener, and the oil film is used because the echo produced at the oil fastener interface is sufficiently distinct that test means 18 can use it to start and stop a tensile force measurement. It will further be recognized that the cavities within the sockets defined by their respective bores constitute a fluid reservoir for holding a quantity of the oil pumped to the couplant.

The use of couplant 12 provides a mechanism by which motor 12 can thread fastener F; while at the same time allow the transducer required for the measurement testing to be conveniently positioned adjacent the fastener. It is an advantage of the apparatus that the couplant is readily attached and removed from its location so, for example, the transducer can be replaced, etc. Further, it will be understood that both sockets 26 and 28 are readily interchangeable with other sockets to accommodates a variety of motor drives and/or types of fasteners. Similarly, it will be understood that when apparatus 10 is used with a bolting or fastening machine in an assembly line, the couplant can be installed for automatic insertion of a fastener into the couplant as part of a production sequence.

Figure 4:
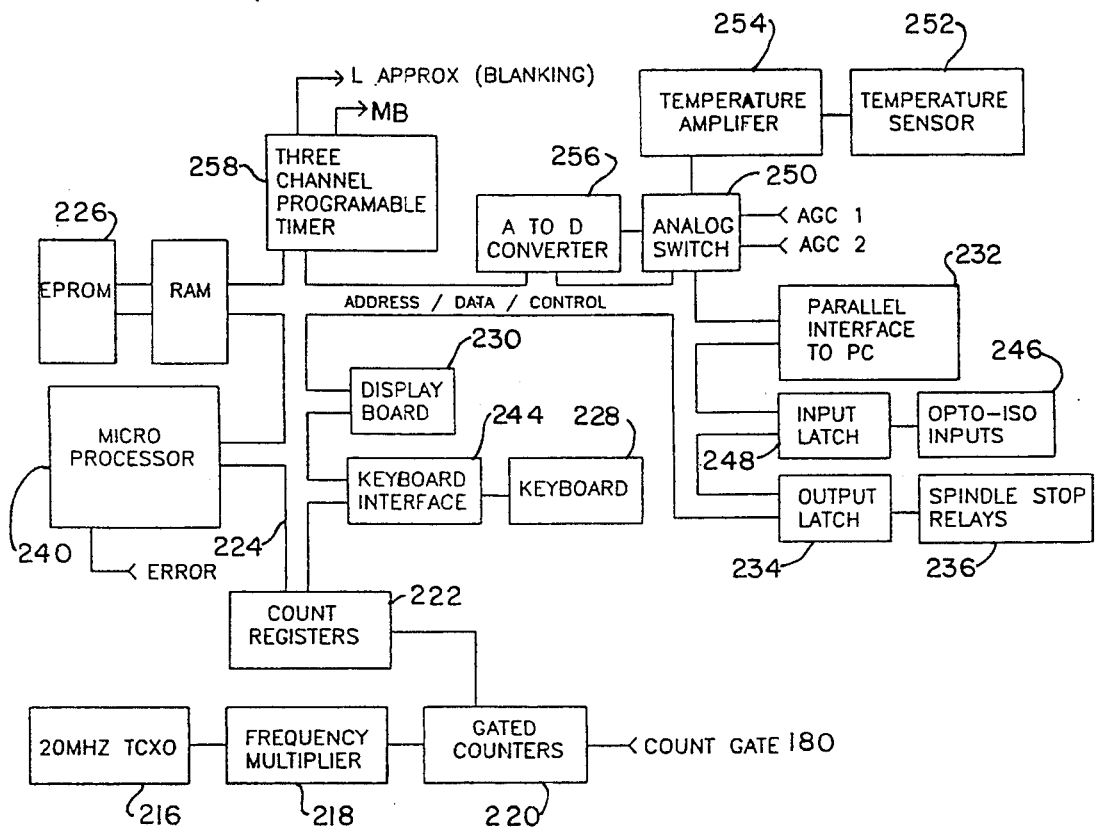
FIG. 4 is a schematic block diagram for a fast stress mike of the apparatus; and, FIG. 5 is a timing diagram for the electronic portion of the apparatus.
Figure 3:
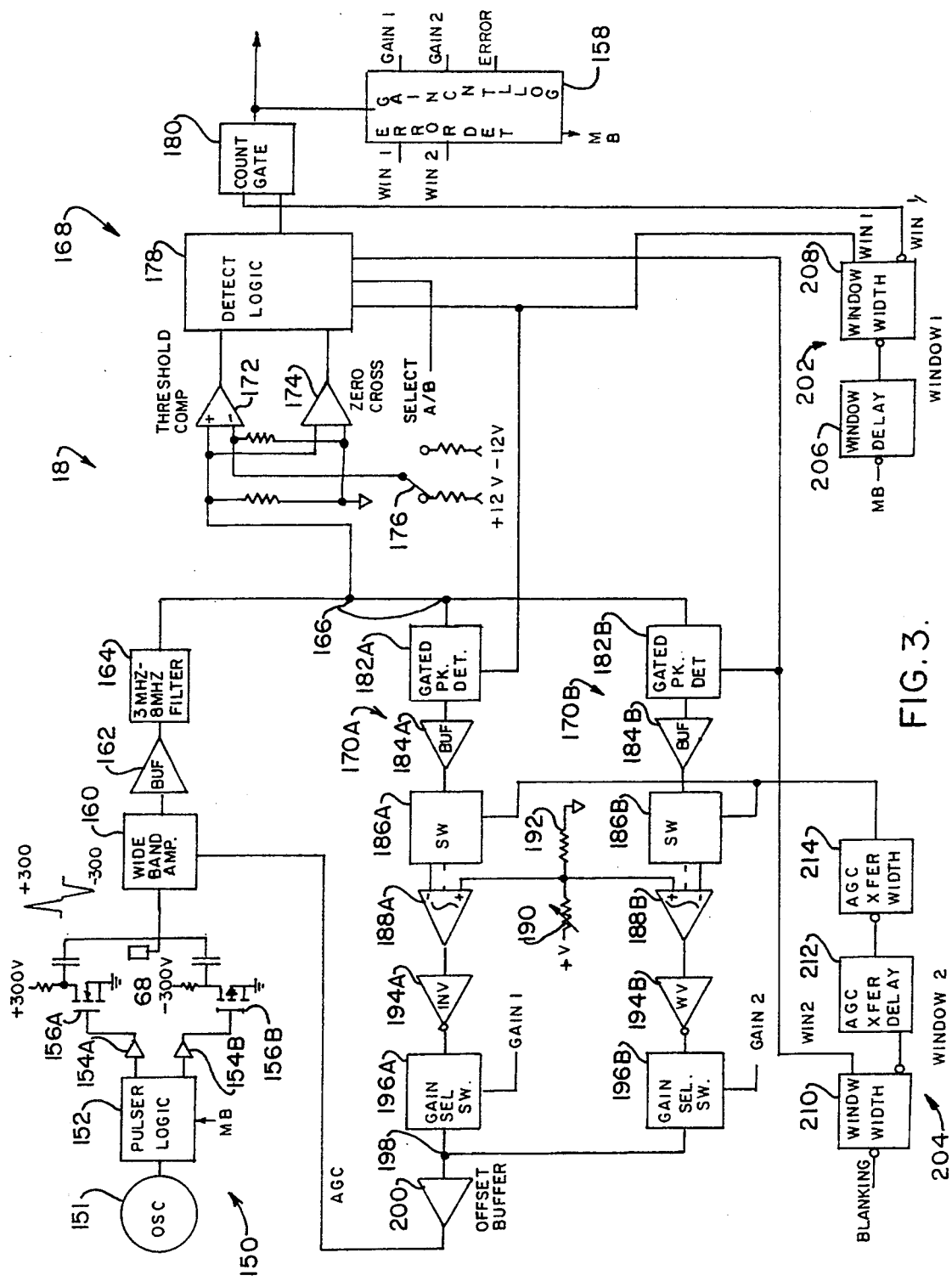
FIG. 3 is a schematic block diagram of a pulser and receiver portion of the electronics for producing ultrasonic waves and a length of fastener signal.
Figure 5:
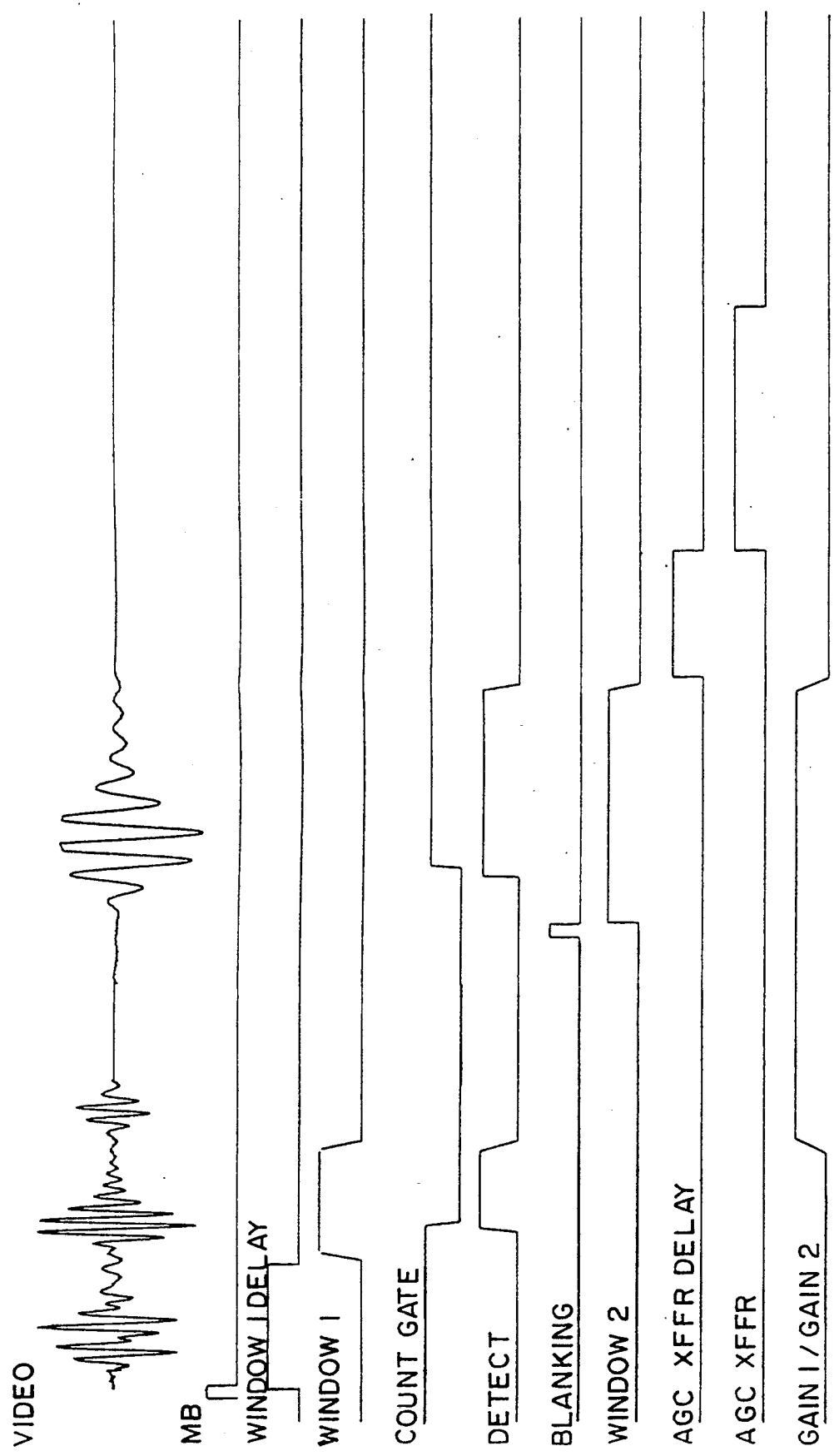

Referring to FIGS. 3-5, a pulser circuit indicated generally 150 includes an oscillator 151 which continuously produces a waveform supplied as an input to a pulser logic unit 152. The logic has a first output to a first high current driver 154A, and a second output to a second high current driver 154B. Each current driver controls operation of a power semiconductor device 156A, 156B respectively. Each device controls a high voltage input which is, for example, +300 v. and −300 v. respectively. The main bang timing originates in a central processing (CPU)/3-channel programmable unit 258 (see FIG. 4). Unit 258 controls opertion of pulses logic 152. The pulser logic unit 152 has an output MB (see FIG. 5) which is supplied to the pulser logic for this control purpose. When the pulser logic is enabled to activate the high current drivers, the pulser logic first activates one driver, and then the other. Further, each current driver is only momentarily activated by the pulser logic. As a consequence, a 600 v. spike is produced at the output from the pulser circuit. This spike is applied to piezoelectric transducer 68 via wire 110.

As noted earlier, transducer 68 generates an ultrasonic wave which is applied to the head of fastener F through the layer of oil. An echo is produced at the oil/fastener interface. The wave then propagates down the length of the fastener, and when it reaches the other end is reflected back toward the transducer. When the return wave reaches the oil/fastener interface, another echo is produced. Fastener F can range in length from approximately 0.5 inches (1.27 cm.) to approximately twenty feet (6.1 m.). Consequently the actual transit time between the head of the fastener to its end and back can vary greatly. However, various applications of apparatus 10 require that the length of the fastener be precisely measured.

The echoes from the transmitted and return ultrasonic waves are reconverted to electrical signals by transducer 68 and applied as inputs to a wideband amplifier 160. The amplified signals are then buffered at 162 and filtered by a 3 MHz–8 MHz filter 164. The now amplified and filtered signals are routed through a node 166. From there, the signals are routed to an echo detection circuit indicated generally 168, and, in parallel, through respective feedback gain control circuits 170A, 170B. Echo detection circuit 168 first includes a high speed comparator 172 functioning as a threshold comparator. The comparator distinguishes the amplitude of an incoming echo pulse from noise. The input signal to the comparator is also directed to one input of a second comparator 174; this comparator acting as a zero crossing detector. A switch 176 allows the user to establish whether the echo detection will be based upon the positive or negative portion of the first excursion of the echo signal. The selection made by the user is provided as a second input to both comparators and the detect logic 178. The output signals from the threshold comparator and zero crossing detector are both provided as inputs to a detect logic 178. The output from the detect logic, in turn, is used to enable a count gate 180. Gate 180 enables the counting of clock pulses for the period between the occurrence of the first echo pulse and the occurrence of the second echo pulse. In operation, detect logic 178 and WIN 1/208 begins the count gate when the first echo pulse is received, and inhibits, or stops, the count gate when the second echo pulse is received after WIN 1 times out. For purposes of further discussion, the period of time associated with the first echo signal may be considered a first window in time (WIN 1) and the period of time associated with the second echo pulse, a second window (WIN 2).

In order to obtain as precise a length measurement as possible, it is important that the gain of wide band amplifier 160 be controlled as closely as possible. This, however, is difficult to do, since the reception of inputs from transducer 68 is not continuous. Further, the two echo signals which are used to make the length measurement do not have the same characteristics. This can be seen in FIG. 5. As shown there, the second echo signal, for example, exhibits ringing characteristics which the first echo signal does not. To resolve this accuracy problem, feedback control circuit 170A is responsive to the occurrence of the first echo signal to adjust amplifier 160 gain for each window WIN 1. The other feedback control circuit 170B is responsive to the occurrence of the second echo signal to the adjust the gain of the amplifier during the second window WIN 2. Each feedback gain control circuit 170A, 170B first respectively includes a gated peak detector 182A, 182B. Each peak detector is supplied a signal WIN 1 or WIN 2 respectively. These signals enable the respective peak detectors during the respective window period, but otherwise disable the detector. The output of the peak detectors is directed through a buffer amplifier 184A or 184B, to the input of a switch 186A, 186B. Each switch has as a second input, a transfer signal. When enabled, the respective switch passes the feedback signal to one input of a respective integrator 188A, 188B. The integrator has as a second input a reference signal representing the desired signal amplitude. This latter signal is developed across a resistance network comprising a potentiometer 190 and a resistor 192. The integrators adjust the gain during the period of the respective windows WIN 1 or WIN 2, and the output of the integrator is supplied through a respective inverter 194A, 194B to inputs of a gain select switch 196A, 196B. Each gain select switch also has as a control input a gain signal from the error detect and gain control logic 158. The switches each have an output to a common node point 198. The node is connected to a gain control input of amplifier 160 through an offset buffer 200.

In addition to the elements above described, circuits 168, 170A, and 170B further include WIN 1 and WIN 2 circuits 202 and 204 respectively. Referring to FIG. 5, WIN 1 circuit 202 includes a window delay module 206 to which the MB signal is an input. The output from module 206 is applied as an inverted input to a window width module 208. This modules supplies two outputs. One, a WIN 1 signal is supplied as an input to detect logic 178, as well as to gated peak detector 182A. The other output from this module is supplied as a second input to count gate 180. Circuit 204 first includes a window width module 210 having as an input a blanking signal. One output from this module is a WIN 2 signal which is supplied as an input to gated peak detector 182B. Module 210 also supplies a control input to an AGC transfer delay module 212. Module 212, in turn, supplies an output to an AGC transfer width module 214. An output from this module is the control input to both switches 186A and 186B.

Referring now to FIG. 4, a 20 MHz oscillator 216 produces clock signals which are supplied to a frequency multiplier 218 which, for example, has a multiplication factor of 30. Consequently, the clock pulses from the multiplier to an input of a gated counters module 220 is on the order of 360 MHz. The counters 220 are enabled by the output of count gate 180 as previously described. The counted pulses are tabulated in a count registers module 222. The output of the count registers is routed over an internal bus 224 within the test means. The test means includes an EPROM 226 which is programmed to convert, after a count cycle (i.e., after a second echo signal), the value contained in the count register module to a measure of fastener length and/or the clamping force exerted on the components X1, X2 by the fastener. The resultant value routed over bus 224 to a display board 230. The display board visually displays the result on a display panel 230 on the face of the test means (see FIG. 1). The count registers value may also be routed over bus 224 to an interface 232 between the test means and the computer 20. As previously discussed, computer 20 allows for the test data to be stored for subsequent processing and analysis. When the measurement is completed, if the clamping force exerted by the fastener on the components equals the predetermined force, a signal is routed over bus 224 to an output latch 234. The latch output is directed to a spindle stop relay 236 to produce stoppage of motor 14 and threading of the fastener into the components. The command line 238 between the test means and the drive means 16 is shown in FIG. 1.

Test means 18 further includes a microprocessor 240 and a keyboard 228 located on the front panel of the test means. The keyboard communicates with the microprocessor via an interface 244. Further, the test means includes an optical isolator module 246 and an associated input latch 248 by which a test cycle input signal is generated. An analog switch module 250 has as inputs the AGC levels produced by feedback circuits 170A, 170B. A temperature sensor 252 monitors the temperature of the fasteners. The sensor output is amplified at 254 and also provided as an input to the analog switch. Because the rate of propagation of an ultrasonic wave through the fastener is a function of the fastener temperature, the output of the temperature sensor allows the test means to compensate the value stored in registers 222 for changes in temperature. The output of the analog switch is converted from analog to digital by a D/A converter 256 and supplied to bus 224. Lastly, a programmable timer 258 is used to set various time intervals within the test means. These intervals include, for example, the repetition rate of the MB signal when it is triggered (see FIG. 5) together with the length of the blanking signal.

Referring again to FIG. 2, incorporated in motor 14 is a torque and angle sensor 260. The output of this sensor is supplied to the test means via an output line 262. While torque is not used to measure the clamping force exerted by the fastener, use of a torque and angle measurement is important. This is so because the torque measurement will indicate if a fastener thread has failed, or if an opening O is not deep enough so that the fastener bottoms out. In the former case, the torque measurement will go to zero if the fastener thread fails, even though the length measurement performed by the apparatus will still show the overall fastener length. In the latter instance, the ultrasonic measurement will show very small force in the fastener even though the torque is very large and the angle stops increasing. Regardless of which circumstance may occur, if either does, then it important to stop the threading operation, and either replace the failed fastener with a new one, or substitute a new component for the one whose openings need to reworked.

In operation, a user of the apparatus, using keyboard 228, enters into test means 18, baseline information concerning the fastener being used. This information includes the nominal, unloaded length of the fastener, the material of which the fastener is composed, the end length of the fastener when it is exerting the desired clamping force on the components, etc. Once an assembly operation has begun, a fastener F is affixed in couplant 12 and threaded into component openings by motor 14. As the motor threads the fastener, both torque and angle are measured to protect the apparatus and workpieces in the event of a failure.

As the threading operation proceeds, a pulser output spike of 600 v. is periodically transmitted through the couplant to transducer 68. The transducer produces an ultrasonic wave in response to this input and transmits the wave toward the fastener. The transducer is spaced from the head of the fastener and the wave is transmitted to the fastener through a thin film of oil. At the oil fastener interface, an echo is produced is return to the test means. Upon receipt of this first echo, a count cycle is started. The counting continues until a second echo signal is received. This second signal is caused by the return wave crossing the fastener/oil film interface. After the counting is stopped, the count value is converted into a measure of the clamping force then being exerted by the fastener. If the clamping force is less than the desired force, the threading operation continues and the measurement is repeated. If the clamping does equal the desired force, motor 14 is stopped and the fastening machine indexes the workpiece to the next location where a fastener is required and a new fastener is installed in the couplant for threading. If doing this procedure, the torque and angle measurement indications show either that the fastener has failed or bottomed out in an opening, the threading operation is terminated for appropriate corrective action to be taken.

What has been described is a simple, yet effective method of measuring the clamping force exerted by a fastener on components which it is used to join together. The method and apparatus described employs an ultrasonic measurement technique rather than the torque type techniques previously used. While a torque measurement is made, it is made only to determine if a problem has occurred. In addition, the apparatus is usable with a wide variety of fasteners both as to length of fastener and type of material from which the fastener is made. The apparatus and method allow for an automated fastening operation, and the apparatus can be incorporated into a bolting or fastening machine. The apparatus can also interface with a computer for data storage, retrieval and analysis purposes.

Of great importance to the apparatus is the design and construction of a couplant which performs a number of functions. First, it couple the drive mechanism of the apparatus to the fastener. Second, it positions a transducer adjacent the fastener and, via a novel slip ring construction, allows electrical pulsing and response signals to be routed to and from the transducer even though the drive means of the apparatus may be threading the fastener at a relatively high rate of speed. Third, the couplant allows a fluid to be disposed between the transducer and fastener so an interface is created at which pronounced echo signals are produced. This greatly enhance the electronics portion of the apparatus to determine when ultrasonic waves pass into and out of the fastener so a highly accurate fastener length measurement is made.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. (Amended) Apparatus for measuring and controlling the tensile load on a fastener comprising:
   means for positioning a fastener used to connect together two or more components;
   drive means coupled to the fastener to thread the fastener into place whereby the fastener exerts a clamping force on the components to connect them together, the clamping force created by the fastener producing an equal and opposite tensile force on the fastener;

control means for starting and stopping operation of the drive means, the control means controlling the drive means to thread the fastener into place until it exerts a predetermined amount of clamping force on the components;

test means for generating ultrasonic waves, for transmitting the waves lengthwise through the fastener, and for measuring the transit time therethrough, the transit time of the waves being a function of the tensile force on the fastener and, in turn, a function of the clamping force exerted by the fastener the test means including transducer means positioned adjacent one end of the fastener, the transducer means generating and transmitting ultrasonic waves longitudinally of the fastener, the velocity of the ultrasonic waves passing through the fastener decreasing as the tensile force thereon increases;

pulser means for applying an electrical input to the transducer means to generate an ultrasonic wave, the pulser means providing a range of inputs which allow ultrasonic signals to be produced and transmitted through fasteners having a range of lengths; and, computer means interfacing with both the test means and the control means, the computer means supplying test parameter information to the test means and receiving test results information therefrom, and the computer means receiving fastener status information from the control means, the test means including couplant means for coupling an output from the pulser means with the transducer means with the couplant means being interposed between the drive means and the fastener, and the couplant means including socket means for turning the fastener and slip ring means mounted on the socket means, the slip ring means including sleeve means fitting over the socket means.

2. The apparatus of claim 1 wherein the transducer means comprises a piezoelectric transducer.

3. The apparatus of claim 2 wherein the test means further includes timing means for measuring the transit time of ultrasonic waves through the fastener.

4. The apparatus of claim 3 wherein the computer means is a programmable computer into which is programmed the material of which the fastener is fabricated, the transit time of ultrasonic waves through the fastener also being a function of the material of which the fastener is made, and a predetermined clamping force which the fastener should exert on the components, the computer establishing the transit times for ultrasonic waves through the fastener based on this information.

5. The apparatus of claim 4 wherein the test means further includes integration means to reduce measurement errors which might result from bending of the fastener or increased sonic impedance as the fastener is tightened.

6. The apparatus of claim 5 wherein the couplant means further comprises means for positioning the transducer means adjacent to, but spaced apart from, an end of the fastener.

7. The apparatus of claim 6 wherein the ultrasonic wave generated by the transducer is transmitted to the fastener through a fluid and the couplant means includes a fluid reservoir for holding a quantity of the fluid.

8. The apparatus of claim 7 further including fluid supply means for supplying a quantity of fluid to the couplant means.

9. The apparatus of claim 7 wherein the reservoir means includes means for holding a quantity of fluid, the fluid being interposed between the transducer means and the fastener, whereby an output from the transducer means is transmitted to the fastener through the fluid.

10. The apparatus of claim 1 wherein the socket means has a cavity formed therein in which the transducer means is positioned, and the slip ring means comprises means for routing an output from the pulser means to the transducer means.

11. The apparatus of claim 10 wherein the slip ring means includes electrically conductive ring means, and the couplant means further includes an electrical conductor extending from the ring means to the transducer means.

12. The apparatus of claim 11 further including electrical terminal means to which an output from the pulser means is routed, the terminal means being in electrical contact with the ring means.

13. The apparatus of claim 5 wherein the test means further includes timing means for measuring the transit time of an ultrasonic wave through the fastener.

14. The apparatus of claim 13 wherein the timing means includes means for generating electrical pulses and means for counting the pulses.

15. The apparatus of claim 14 wherein the transducer means is spaced from the adjacent end of the fastener, a fluid is interposed between the transducer means and the fastener whereby an ultrasonic signal transmitted through the fastener is transmitted to the fastener through the fluid and an echo is produced at the interface between the fluid and the fastener and the counting means is responsive to the occurrence of the echo to begin counting the pulses.

16. The apparatus of claim 15 wherein the counting means is further responsive to the occurrence of a second echo which is produced when the ultrasonic wave reaches the other end of the fastener to stop counting pulses, and the test means includes conversion means for converting the pulse count to a tensile load value as function of the fastener material.

17. The apparatus of claim 16 wherein the test means further includes means for comparing the measured tensile load with a predetermined tensile load value to which the fastener is subjected when producing a predetermined clamping force on the components.

18. The apparatus of claim 17 further including means for providing an indication to the control means when the measured tensile load equals the predetermined tensile load for the control means to stop the drive means from further threading of the fastener into the components.

19. The apparatus of claim 6 further including slide means for moving the position of the transducer means relative to the adjacent end of the fastener.

20. The apparatus of claim 1 further including means for measuring the torque imposed on the fastener in addition to measuring the tensile force.

21. The apparatus of claim 20 wherein the torque is measured simultaneously with the tensile force.

22. Apparatus for measuring and controlling the tensile load on a fastener used to connect two or more components test means for generating an ultrasonic wave, transmitting it through the fastener with the transit time being a function of the tensile force on the fastener, and measuring the tensile load based upon a response from the fastener, the test means including pulser means for generating the wave and transducer means positioned adjacent to, but not in contact with, the fastener for transmitting the wave through the fastener;

drive means for driving the fastener into the components to connect them together;

coupling means for coupling the drive means to the fastener to transmit a driving force produced by the drive means to the fastener, the transducer means being installed in the coupling means for positioning the transducer means adjacent the fastener;

fluid means for supplying a fluid to the coupling means to form a film between the transducer means and the fastener means through which the wave is transmitted therebetween;

control means responsive to the test means for operating the drive means; and, slide means for positioning the transducer means adjacent the fastener, said slide means including a first slide which is in contact with the coupling means and a second slide which is in contact with the fastener, the transducer means being installed in the second slide in a spaced relationship from the fastener, the second slide being biased into contact with the fastener and movable relative to the first slide to keep the transducer means positioned adjacent the fastener even if the fastener is vibrating.

* * * * *